May 4, 1954  M. FRIEDMAN  2,677,487
FOOD PACKING DEVICE
Filed Dec. 31, 1952  2 Sheets-Sheet 2
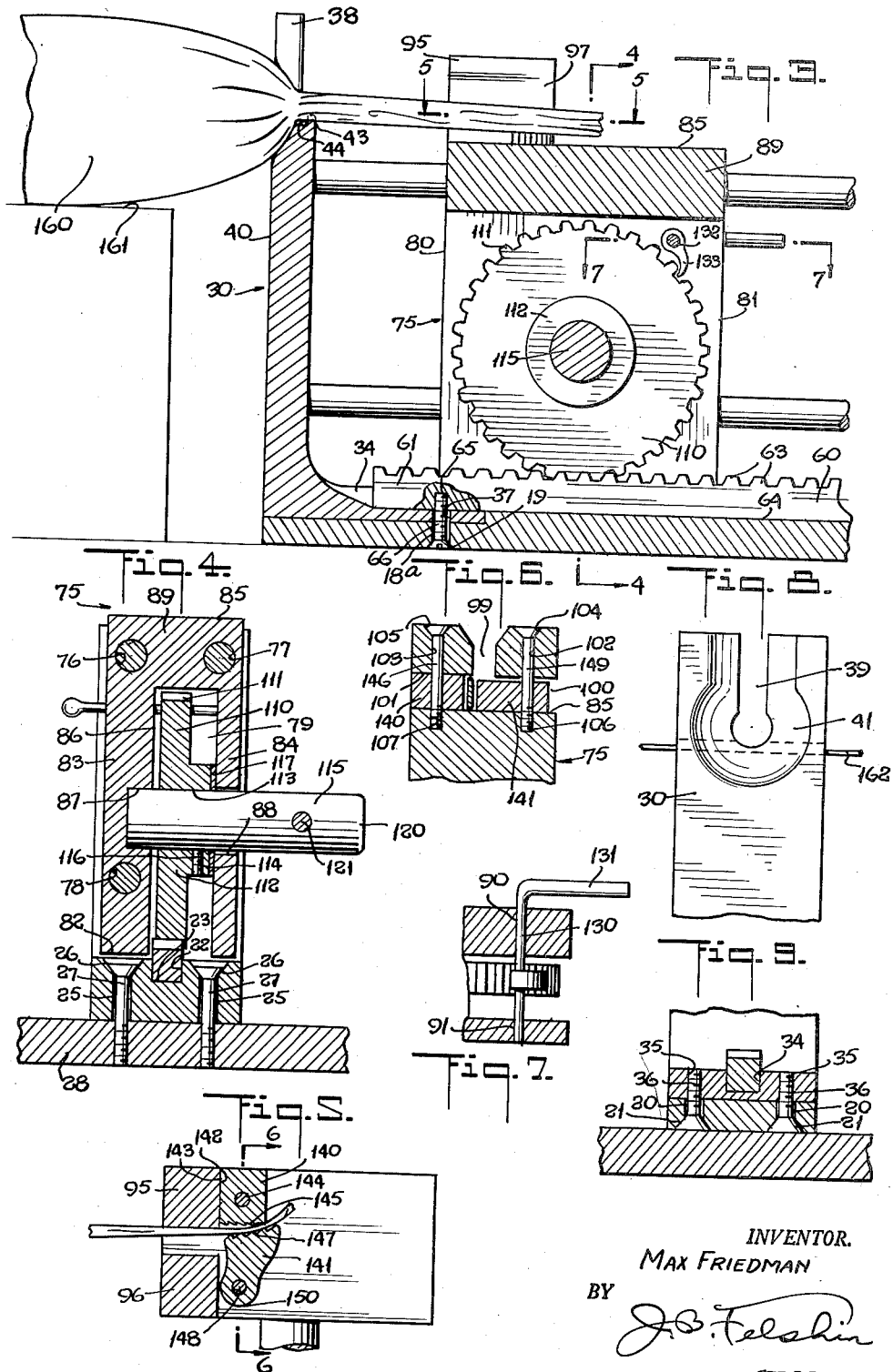
INVENTOR.
MAX FRIEDMAN
BY
J. B. Felshin
ATTORNEY Patented May 4, 1954

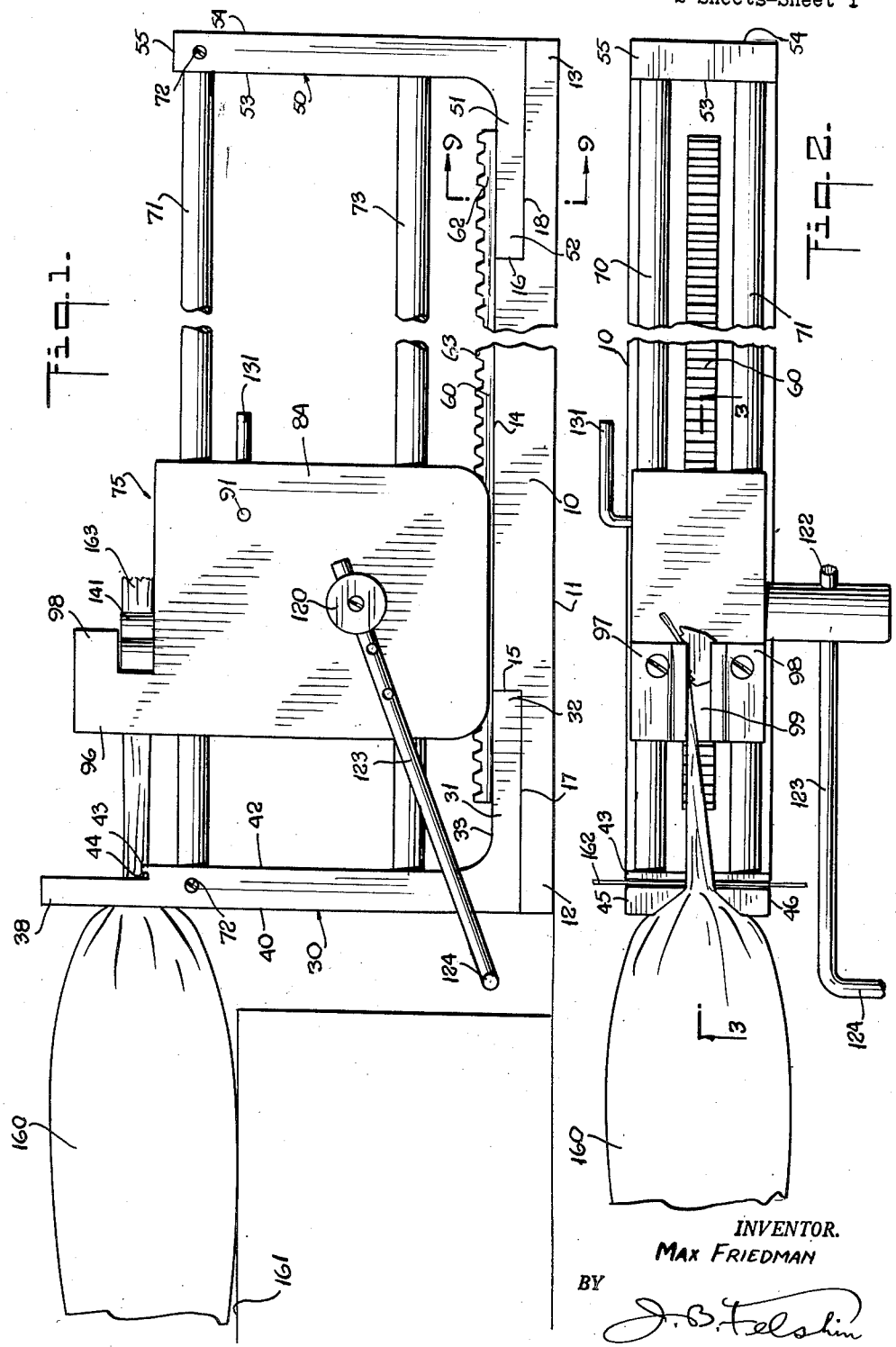

2,677,487

UNITED STATES PATENT OFFICE 2,677,487

FOOD PACKING DEVICE

Max Friedman, Great Neck, N. Y.

Application December 31, 1952, Serial No. 329,076

15 Claims. (Cl. 226—57)

The present invention relates to food packing devices. It is particularly directed to devices for packing boneless food products under pressure in flexible casings.

The particular embodiment of the present invention, which is illustrated in the drawings and which will be described hereinafter in greater detail, comprises generally, a base having an upstanding wall for retaining a food product outwardly thereof while receiving an end of the casing extending inwardly therethrough, jaws adapted to grip the inwardly extending casing end and movable toward and away from the retaining wall, and means for holding the jaws away from the wall while a fastener is secured about the inwardly extending casing end.

While it has long been the common practice to package boneless food products in flexible casings, such operation has, until recently, been performed entirely by hand. This resulted in casings which were loose and permitted the contained food product to wrinkle and shrivel within the casing. This is undesirable for reasons of health, as well as appearance and the inability to obtain solid slices from the food product. While there are devices for packing of food products under pressure in flexible casings, such devices all require an external power source, such as electrical, hydraulic, or air pressure. In addition, such devices are large in size and heavy in weight, often requiring permanent installation on concrete foundations. In such previous devices, it is necessary to hold an end of the casing and shift the food product away from said casing end, thereby requiring a carriage of substantial proportions for supporting the food product, and a power drive for effecting the movement of the carriage.

Accordingly, it is a principal object of the present invention to provide a device for pressure packing food products within a flexible casing, which device is small in size, light in weight, and which is easily portable and may be operated upon a table or other convenient surface without being secured thereto.

It is another object of the present invention to provide a pressure packing device for food products which is capable of high speed manual operation without the use of external power drive means. By the present invention, it is possible to hold the food product in one position and draw an end of the casing away from the food product, thereby eliminating the carriage and associated mechanisms of the previous devices and substantially reducing the size and weight of the present device.

It is another object of the present invention to provide a food product pressure packing device, which may be manually actuated, with a minimum of force and pack food products under sufficient pressure to maintain a firm and solid condition and avoid wrinkling and shriveling.

It is still another object of the present invention to provide a pressure packing device for food products, wherein are provided highly improved self locking jaws for gripping an end of the casing, and means for holding the jaws in their extreme position away from the retaining wall, whereby the operator is allowed the use of both hands for securing a fastener about the casing end.

It is a further object of the present invention to provide a pressure packing device of the type described which is simple and durable, effective for its intended purposes, and which can be manufactured and sold at a reasonable cost.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention:

Fig. 1 is a side elevational view of a device constructed in accordance with the present invention, broken away intermediate its ends, and showing a food product within a flexible casing being operated on by the device;

Fig. 2 is a top plan view of the device of Fig. 1;

Fig. 3 is a sectional elevational view taken on the line 3—3 of Fig 2;

Fig. 4 is a sectional elevational view taken on the line 4—4 of Fig 3;

Fig. 5 is a sectional view taken on the line 5—5 of Fig. 3;

Fig. 6 is a sectional view taken on the line 6—6 of Fig. 5;

Fig. 7 is a sectional view taken on the line 7—7 of Fig 3;

Fig. 8 is a fragmentary end elevational view with the food product removed;

Fig. 9 is a sectional view taken on the line 9—9 of Fig. 1.

Referring now more particularly to the drawings, the embodiment of the invention illustrated therein comprises a base or base plate 10 having a lower flat surface 11 adapted to rest upon a horizontal supporting surface. Adjacent the opposite ends of the base plate 10, the upper surface 14 is cut away to form reduced portions 12 and 13 and shoulders 15 and 16 extending upwardly from the horizontal surfaces 17 and 18. The base plate 10 is formed with a through aperture 18a in each of the reduced portions 12 and 13, and centrally thereof. The apertures 18a have their lower ends countersunk as at 19. Also extending through each of reduced portions 12 and 13 are a pair of transversely spaced apertures 20 having their lower ends countersunk as at 21. Intermediate the shoulders 15 and 16, the upper surface 14 is formed with a longitudinally extending groove 22, disposed centrally of the base plate 10 and opening through the shoulders 15 and 16. The bottom wall 23 of the groove 22 is spaced above the surfaces 17 and 18 of the reduced portions 12 and 13. At least one pair of apertures 25 are formed on opposite sides of the groove 22 extending through the base 10 and having their upper ends countersunk as at 26. If desired, threaded fasteners 27 may be extended through the apertures 25 and into a supporting surface 28 for permanently securing the base plate 10.

Mounted on the reduced portion 12 of the base 10 is an upstanding wall or plate, generally designated 30, having a transversely extending portion 31 adjacent its lower end. The portion 31 is adapted to seat on the upper surface 17 of the reduced portion 12 and have its free end 32 abutting the shoulder 15. The upper surface 33 of the transversely extending portion 31 is formed with a groove 34 opening through the end 32 and in alignment with the groove 22. A pair of transversely spaced threaded apertures 35 are also formed in the portion 31 in registry with the apertures 20 for receiving fasteners 36 having their heads seated in the countersunk portions 21 and their threaded shanks secured in the apertures 35, whereby the portion 31 of the wall 30 is fixedly secured to the reduced portion 12 of the base plate 10. The transverse portion 31 is further formed with an aperture 37 opening into the groove 34, and registering with the aperture 18, for a purpose to be described hereinafter. Extending inwardly through the upper end 38 of wall or plate 30 is an inverted keyhole slot 39, the outer face 40 of the plate 30 being dished or recessed adjacent the slot 39, as at 41, for a purpose appearing hereinafter. Adjacent its upper end 38, the inner face 42 of the plate 30 is cut away to form an upwardly facing shoulder 43. Spaced inwardly from the face 42, the shoulder 43 is provided with a groove 44 extending transversely of the plate 30 and opening through its side edges 45 and 46.

Arranged in facing spaced relation with respect to the wall or plate 30 is a wall or plate 50 having a transverse portion 51 adjacent its lower end, which portion is adapted to seat upon the upper surface 18 of the reduced portion 13 of base 10. As described in connection with the transverse portion 31, the transverse portion 51 has its free end 52 abutting the shoulder 16, and is similarly formed with an upwardly opening groove 34 which opens into the groove 22, an aperture 37 opening into the groove 34 and registering with the aperture 18, and a pair of transversely spaced threaded apertures 35 in registry with the apertures 20. Thus, the portion 51 of the plate 50 is secured to the portion 13 of the base 10, in the same manner as the portion 31 of the plate 30 is secured to the portion 12 of the base 10. The plate 50 extends upwardly from the portion 51 having inner and outer surfaces 53 and 54, and having its upper end 55 spaced below the upper end 38 of the plate 30.

Disposed within the groove 22, is a rack 60 having its opposite ends 61 and 62 extending into the grooves 34 in the transverse portions 31 and 51. The rack 60 is formed with upwardly extending teeth 63 and has its lower edge 64 seated on the bottom wall of grooves 22 and 34. Extending inwardly through the lower edge 64 of the rack 60, adjacent each of its ends 61 and 62 is a threaded opening 65, each being in registry with the adjacent openings 37 and 18, whereby a threaded fastener 66 may be inserted through each of the openings 18, 37, and into the openings 65, and secured therein with its heads in the countersunk portions 19. Thus, the toothed rack 60 is held within the grooves 22 and 34, and is secured to the transverse portions 31 and 51 and the reduced portions 12 and 13 of the base 10.

Extending between the walls 30 and 50, adjacent the upper ends thereof, are a pair of horizontally disposed, transversely spaced parallel slide rails or rods 70 and 71. Each of the rails has its opposite ends extending into the plates 30 and 50 and secured therein by set screws 72. Similarly, a horizontally disposed rod 73 is positioned below and under the rod or rail 70 and has its ends secured in the plates 30 and 50. A slide or slide block, generally designated 75, is provided with parallel spaced through bores 76, 77, and 78 for slidably receiving the rails 70, 71 and 73, respectively. In this manner the slide block 75 is mounted for back and forth sliding movement along the base 10. The slide block 75 is formed with an internal cutout portion 79, opening through the ends 80 and 81, and the bottom face 82 to form a pair of flanks or side walls 83 and 84, depending from the top section 89. It will be noted that the flanks or side walls 83 and 84 are disposed on opposite sides of the rack 60, such that the cutout portion 79 is directly above the rack. The inner surface 86 of the side wall 83 is formed with a circular recess 87, and the side wall 84 is formed with a through aperture 88 in registry with the recess 87, for a purpose appearing hereinafter. The side walls 83 and 84 are further formed with a pair of registering through apertures 90 and 91 spaced from the recess 87 and aperture 88.

Disposed on the upper surface 85 of the block 75 are a pair of laterally spaced upstanding lugs 95 and 96. The lugs are preferably fabricated integrally with the slide block and are positioned adjacent the end 80 of the block. Extending from the lugs 95 and 96, toward the block end 81 and spaced above the upper block surface 85 are a pair of overhanging portions or extensions 97 and 98. Thus, the lugs 95 and 96, and their respective extensions 97 and 98, combine to form an open ended intermediate groove 99 and cutout portions 100 and 101, the latter being formed between the extensions 97 and 98, respectively, and the upper block surface 85, and opening into the groove 99. The overhanging portions or extensions 97 and 98 are provided with through apertures 102 and 103, respectively, having countersunk upper ends 104 and 105, and in registry with threaded openings 106 and 107 formed in the upper block surface 85, all for a purpose hereinafter appearing.

Disposed centrally of and within the cutout portion 79 of the slide block 75 is a gear 110 having peripheral teeth 111 engageable with the teeth 63 of the rack 60. The gear 110 is formed with a hub 112 having a central bore 113 which is adapted to register with the recess 87 and the opening 88. Extending inwardly through the hub 112 opening into the aperture 113 is a threaded passageway 114.

In order to mount the gear 110 for rotative movement, a shaft 115 is inserted loosely through the opening 88 in side wall 84, the gear opening 113, and rotatably seated in the recess 87 formed in the side wall 83. The gear 110 is keyed or fixedly secured to the shaft 115 by a set screw 116 extending inwardly through the passage 114 and engageable with the shaft. Thus, the gear 110 is secured to the shaft 115 for movement therewith, and the shaft is rotatably supported in the recess 87 and aperture 88. In order to space the hub 112 from the inner surface of the side wall 84, a washer 117 is circumposed about the shaft 115 intermediate the gear and the side wall 84. It will now be understood that upon sliding movement of the block 75 along the slide rails 76, 77 and 78, the gear 110 will be caused to rotate with the shaft 115 by the meshing engagement of the gear teeth 111 with the rack teeth 83. Conversely, rotation of the gear 110 will effect sliding back and forth movement of the block 75.

Toward this end, the shaft 115 is provided with a lateral extension 120 having a transverse through bore 121. Inserted through the bore 121 and secured therein by any suitable means is one end 122 of a handle rod 123, which has its other end 124 extending laterally outwardly for easy manual operation. Thus, the shaft extension 120, and the handle rod 123, combine to form a hand actuable crank for effecting rotative movement of the gear 110 and, in consequence thereof, sliding movement of the block 75. The diameter of the gear 110 is predetermined such that one half revolution thereof will effect substantial movement of the block in one direction, for a purpose appearing hereinafter.

For reasons appearing hereinafter, it is desired to hold the slide block away from the wall 30 during a certain part of the operating cycle. Means for effecting this holding or locking action are provided in the form of a rod 130 extending through and rotatably supported in the apertures 90 and 91 and having a transversely extending end portion 131 exteriorly of the block 75. Fixedly secured on the rod 130 in the cutout portion 79 is a dog or pawl 132 having a finger portion 133 adapted to selectively engage intermediate a pair of adjacent gear teeth 111, to thereby prevent rotation of the gear in one direction. That is, as seen in Fig. 3, the gear 110 may rotate in a clockwise direction but is prevented from counterclockwise rotation, such that the pawl and gear function in the manner of a rachet mechanism. As the rod 130 is freely rotatable in the openings 90 and 91, the dog 132 may be engaged intermediate a pair of adjacent gear teeth at any selected position by rotation of the arm 131 in a counterclockwise direction as in Fig. 3.

Mounted on the upper face 85 of the slide block 75 are a pair of facing jaws 140 and 141, respectively disposed below the extensions 97 and 98. The jaw 140 has one side edge 142 abutting the inner side 143 of the lug 95, and is provided with a central aperture 144 in registry with the openings 103 and 107. The gripping face 145 of jaw 140 is provided with serrations, or other suitable friction surface, and a fastener 146 is extended through the openings 103, 144, and 107, having its head seated in the countersunk portion 105 and its shank in threaded engagement with the block 75.

Thus, it is seen that the jaw 140 is fixedly positioned with respect to the block 75. The jaw 141 has its gripping face serrated as at 147, and is provided with an aperture 148 in registry with the openings 102 and 106. A threaded pin or fastener 149 extends through the openings 102, 148 and is secured in the opening 106 with its head seated in the countersunk portion 104. The jaw 141 has its non-gripping face curved, as at 150, to permit rotation of the jaw, and has its facing edge adapted to extend through the groove or trough 99 and into engagement with the facing edge 145 of jaw 140. The angular disposition of the gripping face 147 with respect to the pin 149 is such that when an object is disposed between the gripping faces and drawn to the left, as seen in Figs. 2 and 5, the jaw 141 will be urged toward the jaw 140 to more tightly grip the object therebetween.

In operation a food product is disposed within a flexible casing, as at 160, and supported upon any suitable supporting surface 161 with its open end toward the packing device. With the slide block 75 in its position of movement toward the plate 30 and a fastener 162, such as wire or string, disposed within the slot 44, the open end 163 of the casing 160 is inserted inwardly through the keyhole slot 39 in the plate 30 and into the groove 99 formed by the upstanding lugs 95 and 96. The casing end 163 is disposed between the jaws 140 and 149, when the latter are in open position, and the crank 123 is manually rotated in a clockwise direction approximately one half of the revolution. The gear 110 will be rotated, thereby effecting the movement of the block 75 away from the plate 30. The jaws 140 and 141 will be closed by the action of the casing end 123 and will tightly clamp the casing end. As the jaws 140 and 141 move away from the plate 30, the casing 160 will tend to pass inwardly through the slot 39, being restrained by the food product which is held outwardly of the plate 30 and in abutting engagement with the dished surface 41. In this manner the food product is compressed as the casing, or a portion thereof, is drawn through the slot 39. When the desired amount of compression is obtained, it is only necessary to release the handle rod 123 and the block 75 will remain in its position of movement away from the plate 30 by locking action of the dog 132. The operator is now free to use both hands for securing the fastener 162 about the adjacent casing portion. The casing end may then be severed, the casing end and compressed food product being removed from the device, and the arm 131 rotated in a counterclockwise direction, as seen in Fig. 3, to permit the slide block 75 to be moved toward the wall plate 30 in condition for beginning a new cycle.

In view of the foregoing, it will now be understood that a pressure packing device for food products is provided which is of a greatly reduced size, and which is capable of high speed and non-fatiguing manual operation.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. A device for pressure packing a food product in a flexible casing, said device comprising a base, an upstanding plate on one end of said base and adapted to hold said food product outwardly of said base and formed with means to receive an inwardly extending end of said casing, a slide mounted for movement along said base toward and away from said plate, jaws carried by said slide and adapted to releasably grip said casing end, drive means on said slide and said base for effecting the movement of said slide toward and away from said plate, and hand actuable means carried by said slide for operating said drive means.

2. The combination of claim 1 in combination with means for holding said slide in its position of movement away from said plate, and means on said plate for holding a fastener to be secured about said casing.

3. A device for pressure packing a food product in a flexible casing, said device comprising a base, an upstanding plate on one end of said base and adapted to hold said food product outwardly of said base and formed with means to receive an inwardly extending end of said casing, a slide mounted for movement along said base toward and away from said plate, jaws carried by said slide and adapted to releasably grip said casing end, drive means on said slide and said base for effecting the movement of said slide toward and away from said plate, and hand actuable means carried by said slide for operating said drive means, said drive means comprising a rack fixedly secured on said base, and a gear rotatably carried by said slide and in meshing engagement with said rack for effecting movement of said slide toward and away from said plate upon rotative movement of said gear.

4. A device for pressure packing a food product in a flexible casing, said device comprising a base, an upstanding plate on one end of said base and adapted to hold said food product outwardly of said base and formed with means to receive an inwardly extending end of said casing, a slide mounted for movement along said base toward and away from said plate, jaws carried by said slide and adapted to releasably grip said casing end, drive means on said slide and said base for effecting the movement of said slide toward and away from said plate, and hand actuable means carried by said slide for operating said drive means, said drive means comprising a rack fixedly secured on said base, and a gear rotatably carried by said slide and in meshing engagement with said rack for effecting movement of said slide toward and away from said plate upon rotative movement of said gear, said hand actuable means comprising a crank connected to said gear for effecting rotative movement thereof.

5. A device for pressure packing a food product in a flexible casing, said device comprising a base, an upstanding plate on one end of said base and adapted to hold said food product outwardly of said base and formed with means to receive an inwardly extending end of said casing, a slide mounted for movement along said base toward and away from said plate, jaws carried by said slide and adapted to releasably grip said casing end, drive means on said slide and said base for effecting the movement of said slide toward and away from said plate, and hand actuable means carried by said slide for operating said drive means, said drive means comprising a rack fixedly secured on said base, and a gear rotatably carried by said slide and in meshing engagement with said rack for effecting movement of said slide toward and away from said plate upon rotative movement of said gear, and means for holding said slide in its position of movement away from said plate.

6. A device for pressure packing a food product in a flexible casing, said device comprising a base, an upstanding plate on one end of said base and adapted to hold said food product outwardly of said base and formed with means to receive an inwardly extending end of said casing, a slide mounted for movement along said base toward and away from said plate, jaws carried by said slide and adapted to releasably grip said casing end, drive means on said slide and said base for effecting the movement of said slide toward and away from said plate, and hand actuable means carried by said slide for operating said drive means, said drive means comprising a rack fixedly secured on said base, and a gear rotatably carried by said slide and in meshing engagement with said rack for effecting movement of said slide toward and away from said plate upon rotative movement of said gear, and means for holding said slide in its position of movement away from said plate, said last named means comprising a dog rotatably mounted on said slide and selectively engageable with said gear for holding the latter against rotative movement in one direction.

7. A device for pressure packing a food product in a flexible casing, said device comprising a base, a pair of spaced upstanding plates on opposite ends of said base, there being a through opening formed in one of said plates for receiving an inwardly extending end of said casing while holding said food product outwardly of said base, slide rails extending between said pair of plates, a slide block mounted on said rails for back and forth movement toward and away from said one plate, self tightening jaws carried by said slide block and adapted to releasably grip said inwardly extending casing end, a longitudinally disposed rack secured on said base, a gear rotatably mounted on said slide block and in meshing engagement with said rack for effecting the movement of said slide block upon rotative movement of said gear, and hand actuable means for effecting the rotative movement of said gear.

8. A device for pressure packing a food product in a flexible casing, said device comprising a base, a pair of spaced upstanding plates on opposite ends of said base, there being a through opening formed in one of said plates for receiving an inwardly extending end of said casing while holding said food product outwardly of said base, slide rails extending between said pair of plates, a slide block mounted on said rails for back and forth movement toward and away from said one plate, self tightening jaws carried by said slide block and adapted to releasably grip said inwardly extending casing end, a longitudinally disposed rack secured on said base, a gear rotatably mounted on said slide block and in meshing engagement with said rack for effecting the movement of said slide block upon rotative movement of said gear, and hand actuable means for effecting the rotative movement of said gear, and means for holding said slide block in its position of movement away from said one plate.

9. A device for pressure packing a food product in a flexible casing, said device comprising a base, a pair of spaced upstanding plates on opposite ends of said base, there being a through opening formed in one of said plates for receiving an inwardly extending end of said casing while holding said food product outwardly of said base, slide rails extending between said pair of plates, a slide block mounted on said rails for back and forth movement toward and away from said one plate, self tightening jaws carried by said slide block and adapted to releasably grip said inwardly extending casing end, a longitudinally disposed rack secured on said base, a gear rotatably mounted on said slide block and in meshing engagement with said rack for effecting the movement of said slide block upon rotative movement of said gear, and hand actuable means for effecting the rotative movement of said gear, and means for holding said slide block in its position of movement away from said one plate, said last named means comprising a dog rotatably mounted on said slide and selectively engageable with said gear for holding the latter against rotative movement in one direction.

10. A device for pressure packing a food product in a flexible casing, said device comprising a base, a pair of spaced upstanding plates on opposite ends of said base, there being a through opening formed in one of said plates for receiving an inwardly extending end of said casing while holding said food product outwardly of said base, slide rails extending between said pair of plates, a slide block mounted on said rails for back and forth movement toward and away from said one plate, self tightening jaws carried by said slide block and adapted to releasably grip said inwardly extending casing end, a longitudinally disposed rack secured on said base, a gear rotatably mounted on said slide block and in meshing engagement with said rack for effecting the movement of said slide block upon rotative movement of said gear, and hand actuable means for effecting the rotative movement of said gear, means for holding said slide block in its position of movement away from said one plate, and means on said one plate for holding a fastener to be secured about said casing.

11. A device for pressure packing a food product in a flexible casing, said device comprising a base, a pair of spaced upstanding plates on opposite ends of said base, there being a through opening formed in one of said plates for receiving an inwardly extending end of said casing while holding said food product outwardly of said base, slide rails extending between said pair of plates, a slide block mounted on said rails for back and forth movement toward and away from said one plate, self tightening jaws carried by said slide block and adapted to releasably grip said inwardly extending casing end, a longitudinally disposed rack secured on said base, a gear rotatably mounted on said slide block and in meshing engagement with said rack for effecting the movement of said slide block upon rotative movement of said gear, and hand actuable means for effecting the rotative movement of said gear, means for holding said slide block in its position of movement away from said one plate, and means on said one plate for holding a fastener to be secured about said casing, said last named means comprising a shoulder on the inner face of said plate, there being an upwardly opening groove formed in said shoulder for supporting said fastener.

12. A machine of the character described, comprising a member having a bottom portion and a pair of upstanding end portions, a rack fixed to the bottom portion, guide members interconnecting said upstanding end portions and disposed parallel to the bottom portion, a block slidably mounted on said guide member, a gear journalled on said block and meshing with said rack, a handle fixed for rotation with said gear, one of said upstanding members being formed with a slot, a fixed abutment member on said block and a rotary abutment member on said block about a vertical axis and rotatable toward said fixed abutment member.

13. The combination of claim 12, said fixed and rotating abutment members being formed with serrated teeth to grip an article therebetween.

14. The combination of claim 12, said block being formed with a slot aligned with the slot in said slotted upstanding member and said abutment members being located on opposite sides of said block.

15. A machine of the character described, comprising a base member having a bottom intermediate portion, upstanding end portions, a guide member interconnecting said upstanding portion, a block slidably mounted thereon and disposed between said upstanding portions, a rack fixed to the upper surface of the intermediate portion of the base member, a shaft journalled on said block, a gear fixed to said shaft and meshing with said rack, said shaft having a portion extending to one side beyond said block, a handle fixed to the extending portion of said shaft, said gear and rack being so dimensioned relative to the distance between said upstanding portions that if the machine is placed on a table, the handle may be grasped and rotated wholly above the table and without going below the top surface of the table to move said block through the major portion of the length between said upstanding portions, one of said upstanding portions being formed with a slot extending down from its upper end, and releasable gripping means on said block substantially at the level of the lower end of said slot.

No references cited.